UNITED STATES PATENT OFFICE.

JAMES F. McGOWAN, OF BROOKLYN, NEW YORK, ASSIGNOR TO THE IRON CLAD MANUFACTURING COMPANY, OF NEW YORK, N. Y.

ENAMELED WARE AND ORNAMENTING THEREOF.

SPECIFICATION forming part of Letters Patent No. 596,942, dated January 4, 1898.

Application filed May 7, 1897. Serial No. 635,553. (Specimens.)

*To all whom it may concern:*

Be it known that I, JAMES F. McGOWAN, a citizen of the United States, residing in Brooklyn, in the county of Kings and State of New York, have invented certain new and useful Improvements in Enameled Ware and the Ornamenting Thereof, of which the following is a specification.

This invention relates to the art of ornamenting surfaces and articles of metal—such, for instance, as iron or steel—or of other suitable material upon the surface of which an enamel, vitrifiable, or other coating analogous thereto is applied, thereby to mark or ornament the same and give it a shaded or clouded appearance.

The object of the invention is to provide a new and improved process and article of ornamented ware in the manufacture of which simplicity in the process of manufacture, as well as highly satisfactory results in the appearance of the article when produced, combine to make the process and article useful in the art to which they appertain.

Heretofore there have been various processes for obtaining enameled ware having what is technically called a "mottled appearance," all of which, however, are essentially different from the process herein about to be described, the results of which must be carefully distinguished from the effect obtained by the processes above mentioned.

As a preface to a description of this improved process, it will be understood that I may or may not use, as is deemed preferable, an ordinary ground or base coat on which the coatings hereinafter described may be placed, and it will also be understood that the process herein described is one which is capable of a wide range of application, and therefore within the scope of this invention is included any article of any suitable material on which a vitrifiable or other analogous surface may be obtained.

This improved art or process contemplates, in a general way, the coating of the surface to be treated with some suitable vitrifiable material—such, for instance, as an enameling material—or composition analogous thereto, and while such surface coating is still undried and moist applying thereto a partial coating of vitrifiable material—such, for instance, as an enameling material—or a compound analogous thereto of the same general constituency, but of a contrasting color and of greater fluidity than the coating upon which it is applied, then while the article is still wet with such contrasting coatings and in such condition that there can be a partial intermingling of the two enamels giving to the so-treated surface a vibratory motion, thereby so commingling the enamel coatings one with the other as to produce a clouded or shaded appearance, and then firing such surface so treated, whereby a durable product having an attractive and ornamental appearance is obtained. The enameling material or compound may be prepared in accordance with any of the well-known formulas by which enamel is compounded and prepared for use in the ordinary processes of enameling, and therefore it will be understood that I do not confine myself to any particular formula in preparing and compounding such enamel coating, nor do I confine myself to any particular color or colors or tints of the same.

In carrying out this improved process the article or ware is first suitably prepared and may or may not have a foundation enamel coating, as may be preferred. The article to be ornamented having been so prepared, a coating of enameling material of any desired color is then applied, this being done in a relatively even coating, and while this coating is still undried and moist a partial coating of enameling material or compound analogous thereto of a contrasting color or tint relatively to the color or tint of the undried coating is applied. This partial coating may be of the same constituency, except as to color, as such undried coating, but is of such consistency that the same can be readily sprayed onto such coating, and in practice it is preferably of a greater degree of fineness and of greater fluidity than such foundation coating and is made a partial coating by being deposited in small drops or globules on that part of the surface of the article which the operator desires to decorate, such deposition being made in any desired way. In practice, however, it is preferably made by spraying the same thereon. While the article is still wet with such coatings and is in such condition that there can be a partial intermingling of these two enameled coatings of contrasting color, the article is subjected to vibration—as, for instance, by shaking or lightly striking the same—whereby by means of this vibratory motion there is an agitation of the still wet coatings, this producing the required partial intermingling of the same.

From the foregoing it will be seen that immediately after the first coat is applied, this being done in a relatively even coating, and before the same has had time to dry materially the second or ornamenting material, which is of a relatively thinner consistency, is put on in spots and the article so treated then subjected to physical agitation. The vibration due to this agitation causes the superimposed bodies of ornamenting material to move along on the base coating, and in their progress through the relatively short distance which in practice they traverse the ornamenting material leaves behind its principal mass, some of its material adhering to the first coating, the principal part, however, moving along as directed by the vibration of the article, and during all this time there is going on an evening-up action of the fluid part of one coating with the fluid part of the other coating, and this action of the two fluids—that is, of the water of each of the two coating materials (in the area where one is superimposed upon the other)—is proceeding during the subjection of the article to the physical action, so that in a brief period the equalization of the fluids has progressed so far as to bring them into essentially the same condition and thereby terminate the commingling of the coloring-matter of the second coating with the material of the surface of the first coating and so stop the blending and the shading of the two materials. In practice and under the conditions described the blending is thus made to extend to only a portion of the superimposed material and to extend principally to the thinner portions formed by the moving along or the spreading or both of the small masses or areas of the second or ornamenting coating. By means of this mode of distributing or disposing the ornamenting material upon the article to be ornamented there is produced a peculiar and unique result, an ornamentation of a most desirable and pleasing appearance, and different from anything heretofore produced in this art. The article so treated is then fired in the usual manner, whereupon a product is secured which has a beautifully clouded and shaded surface—that is to say, the drops or globules of colored enamel which made up the partial coating have been so disseminated and intermingled with the surrounding coating into and upon which it was applied that the coloring produced by these drops or globules is graduated in intensity of color, and appears sometimes as shaded spots and sometimes as shaded lines, all tending to form a graduated, clouded, or shaded surface, these spots or lines varying in appearance according to the size and number of the drops or globules and the amount of vibratory motion given to the article during the process.

From the foregoing it will be seen that this process is essentially different from any other process known in the art, as in the present process a commingling and blending of the two enamels by vibratory motion is obtained, thus producing a peculiar clouded or shaded appearance.

By this process I am enabled to produce articles of enamel ware at a comparatively low cost and of great uniformity in quality and finish, which is much desired by the trade, and give to the ware an ornamental appearance essentially different from the mottled or spotted appearance in enameled articles heretofore produced.

Having thus described my invention, I claim—

1. The process of ornamenting surfaces, which consists in applying thereto a moist vitrifiable coating; then, while said coating is still moist and undried, applying a contrasting partial coating of fluid vitrifiable material of the same general constituency, but of greater fluidity than said first coating; then, while these coatings are still wet, subjecting the surface so treated to vibratory motion, thereby to secure a blending or intermingling of the coatings, whereby, after subjection to heat, a surface is produced having a graduated clouded or shaded appearance as contradistinguished from a mottled one.

2. The herein-described article of enameled metal ware having a graduated clouded or shaded ornamented enameled surface consisting of a foundation coating of enameling material and an outer contrasting partial coating of enameling material which was of greater fluidity than said foundation coating, the two coats commingled together, substantially as set forth.

JAMES F. McGOWAN.

Witnesses:
CHESTER COMSTOCK,
JOHN S. CLARK.